United States Patent [19]
Hattori

[11] Patent Number: 5,899,779
[45] Date of Patent: May 4, 1999

[54] OIL SYSTEM DRAIN FOR PERSONAL WATERCRAFT

[75] Inventor: Toshiyuki Hattori, Iwata, Japan

[73] Assignee: Yamaha Hatsudoki Kabushiki Kaisha, Iwata, Japan

[21] Appl. No.: 08/946,120

[22] Filed: Oct. 7, 1997

[30] Foreign Application Priority Data

Oct. 7, 1996 [JP] Japan .................................. 8-265671

[51] Int. Cl.⁶ .................................................. B63H 21/10
[52] U.S. Cl. ............................................................ 440/88
[58] Field of Search ....................... 440/88, 89; 114/343, 114/270; 184/1.5

[56] References Cited

U.S. PATENT DOCUMENTS

| | | | |
|---|---|---|---|
| 4,875,884 | 10/1989 | Meisenburg | 440/88 |
| 4,986,777 | 1/1991 | Preston | 440/88 |
| 5,199,914 | 4/1993 | Marsh | 440/88 |
| 5,366,400 | 11/1994 | Kucik | 440/88 |

*Primary Examiner*—Stephen Avila
*Attorney, Agent, or Firm*—Knobbe, Martens, Olson & Bear LLP

[57] ABSTRACT

A drain arrangement is provided for a lubricating system of an engine powering a watercraft. The engine is mounted to a hull of the watercraft, and includes a lubricating system having a lubricant collector positioned at a bottom of the engine and a lubricating system drain also positioned at the bottom of the engine through which lubricant may be drained from the collector. An access opening is provided in a bottom of the hull adjacent the lubricating system drain and a hull access opening cover plate is provided for selectively opening and closing the access opening.

21 Claims, 17 Drawing Sheets

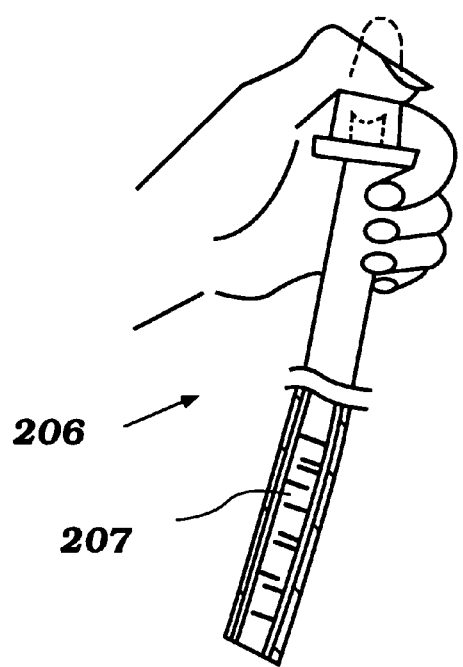
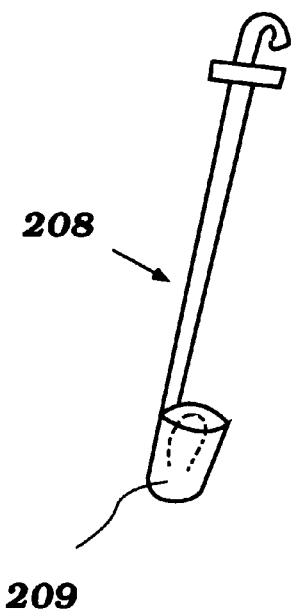
Figure 9 (a)
Figure 9 (b)

OIL SYSTEM DRAIN FOR PERSONAL WATERCRAFT

FIELD OF THE INVENTION

The present invention relates to a lubricating system for an internal combustion engine. More particularly, the present invention relates to an oil or lubricating system drain for watercraft propelled by a water propulsion device powered by an engine.

BACKGROUND OF THE INVENTION

Two-cycle engines are used to power watercraft, including smaller watercraft known as "personal" watercraft. These engines have the advantage that they are fairly powerful, and relatively lightweight and compact.

One particular disadvantage to the two-cycle engine is its emission content. Two-cycle engines exhaust large quantities of carbon monoxide (CO) and various hydrocarbons. When measures are taken to reduce the emission content of the two-cycle engine, other generally undesirable consequences result, such as an increase in the weight of the engine, a reduction of its power output or the like.

Four-cycle engines are commonly used as a power plant in other applications, such as automobiles. These engines have the advantage that their emission content is desirably lower and the engines have a high power output.

On the other hand, four-cycle engines are generally arranged with oil-filled crankcases or reservoirs positioned at the bottom of the cylinder block. In addition, the oil filter is positioned at the bottom of the engine. This impedes use of the four-cycle engine in this type of watercraft. In particular, when this type of engine is mounted in a watercraft in a manner in which the drive shaft is generally horizontally extending, the oil reservoir and oil filter are positioned under the engine adjacent the hull. This arrangement prevents the watercraft's owner from being able to service the engine, including replacing the oil and oil filter, through a service access which is normally provided in the top deck of the hull.

It is desired to provide a watercraft with a four-cycle engine having a lubricating system which is accessible for servicing and the like.

SUMMARY OF THE INVENTION

In accordance with the present invention there is provided lubricating system for an internal combustion engine powering a water propulsion device of a watercraft. The lubricating system and associated watercraft and engine structures are arranged to provide an improve lubricant system access and drain arrangement.

The watercraft is preferably of the personal watercraft variety, and includes a hull. The engine is mounted to the hull of the watercraft.

The lubricating system associated with the engine includes a lubricant collector positioned at a bottom of the engine and a lubricating system drain also positioned at the bottom of the engine through which lubricant may be drained from the collector. An access opening is provided in a bottom of the hull adjacent the lubricating system drain and a hull access opening cover plate is provided for selectively opening and closing the access opening.

Further objects, features, and advantages of the present invention over the prior art will become apparent from the detailed description of the drawings which follows, when considered with the attached figures.

BRIEF DESCRIPTION OF THE DRAWINGS

FIG. 9(a) illustrates a first type of lubricant checking device for use with the lubricating system in accordance with the first embodiment of the present invention;

FIG. 9(b) illustrates a second type of lubricant checking device for use with the lubricant system in accordance with the first embodiment of the present invention;

DETAILED DESCRIPTION OF THE PREFERRED EMBODIMENTS OF THE INVENTION

Figure 1:
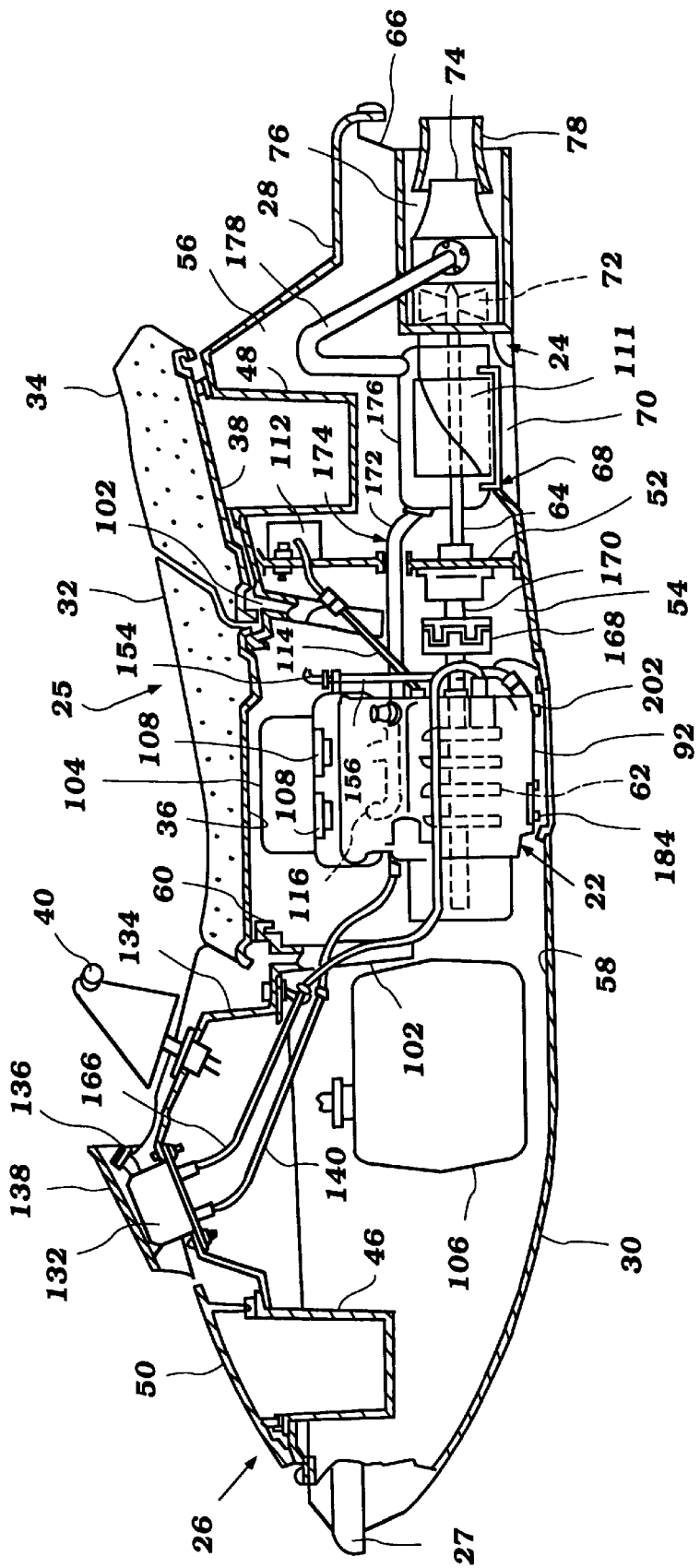
FIG. 1 is a cross-sectional side view of the watercraft illustrated in FIG. 1 as powered by an engine having a lubricating system in accordance with a first embodiment of the present invention.

FIGS. 1–9 illustrate a watercraft 20 powered by an engine 22 having a lubricating system with a drain arranged in accordance with a first embodiment of the present invention. The terms "oil" and "lubricant" (and variations thereof) are used interchangeably herein, and are intended to mean a lubricant material such as natural petroleum oil, synthetic oil and other materials as known to those skilled in the art for use in lubricating an engine.

As illustrated, the watercraft 20 generally comprises a watercraft body 25 having the engine 22 mounted therein for powering a water propulsion device. The watercraft body 25 preferably comprises a hull 26 having a top portion or deck 28 and a lower portion 30. A gunnel 27 defines the intersection of the hull 26 and the deck 28. A pair of ribs 31 preferably extend outwardly from the outer surface of the lower or bottom portion 30 of the hull 26. The ribs 31 are provided on either side of a centerline extending through the craft from end to end.

In addition, the body 25 includes a front seat 32 and a rear seat 34 positioned on the top portion 28 of the hull 26. The front seat 32 is preferably connected to a first removable deck member 36 (see FIG. 2). The rear seat 34 is preferably connected to a second removable deck member 38. A steering handle 40 is provided adjacent the front seat 32 for use by a user in directing the watercraft 20.

A bulwark 41,42 extends upwardly along each side of the watercraft 20. A foot step area 44,45 is defined between each seat 32,34 and its adjacent bulwark 41,42.

The watercraft 20 as illustrated in FIG. 1 includes a pair of storage boxes 46,48. A rear storage box 46 is preferably positioned underneath the rear seat 34 and is accessible by removing the second removable deck member 38. The front storage box 48 is preferably a recessed area in the top or lid portion 28 of the hull 26 at the bow of the craft, and includes a cover 50 selectively extendible over the storage box 48 for protecting the items therein from water and the like.

Figure 4:
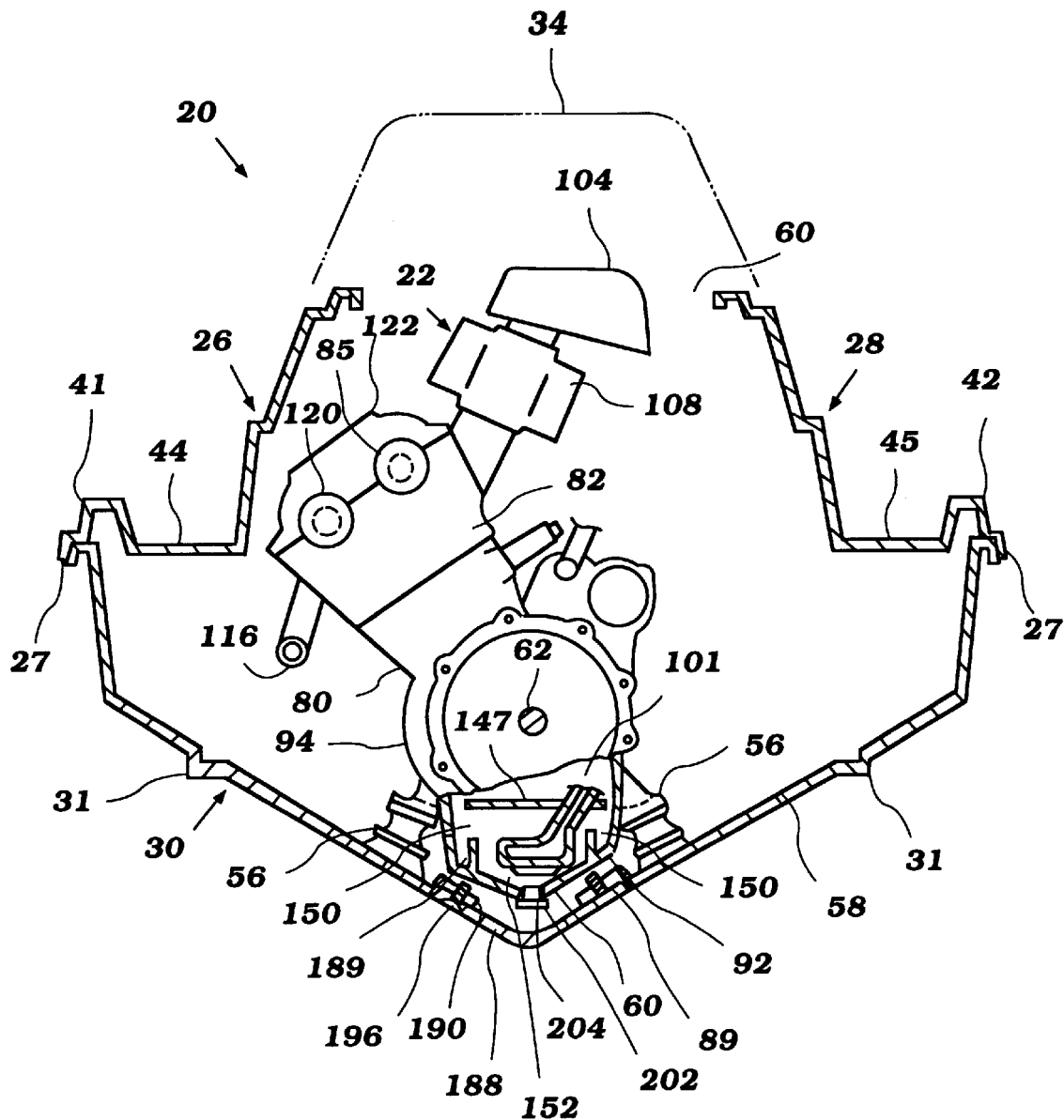
FIG. 4 is a cross-sectional front view of the watercraft illustrated in FIG. 1, exposing the engine therein, with the engine illustrated in partial cross-section.

The top and bottom portions 28,30 of the hull 26, along with a bulkhead 52, define an engine compartment 54 and a pumping compartment or chamber 56. The engine 22 is positioned in the engine compartment 54. As best illustrated in FIG. 4, the engine 22 is connected to the hull 26 via several engine mounts 56 connected to a bottom 58 of the lower portion 30 of the hull 26. The engine 22 is preferably partially accessible through a maintenance opening 60 which is itself accessible by removing the first removable deck member 36 on which the front seat 32 is mounted.

The engine 22 has a crankshaft 62 which is in driving relation with an impeller shaft 64. The impeller shaft 64 rotationally drives a means for propelling water of the propulsion unit 24, which unit extends out a stern portion 66 of the watercraft 20.

The propulsion unit 24 includes a propulsion passage 70 having at least one intake port 68 (see FIGS. 1 and 5) which extends through the lower portion 30 of the hull 26. A screen 69 (see FIG. 7) may be positioned over this port 68. The means for propelling water, preferably an impeller 72 driven by the impeller shaft 64, is positioned in the passage 70. The passage 70 also has an outlet or jet 74 positioned within a nozzle 78 in a chamber 76. The nozzle 78 is mounted for movement up and down and to the left and right, whereby the direction of the propulsion force for the watercraft 20 may be varied.

Figure 2:
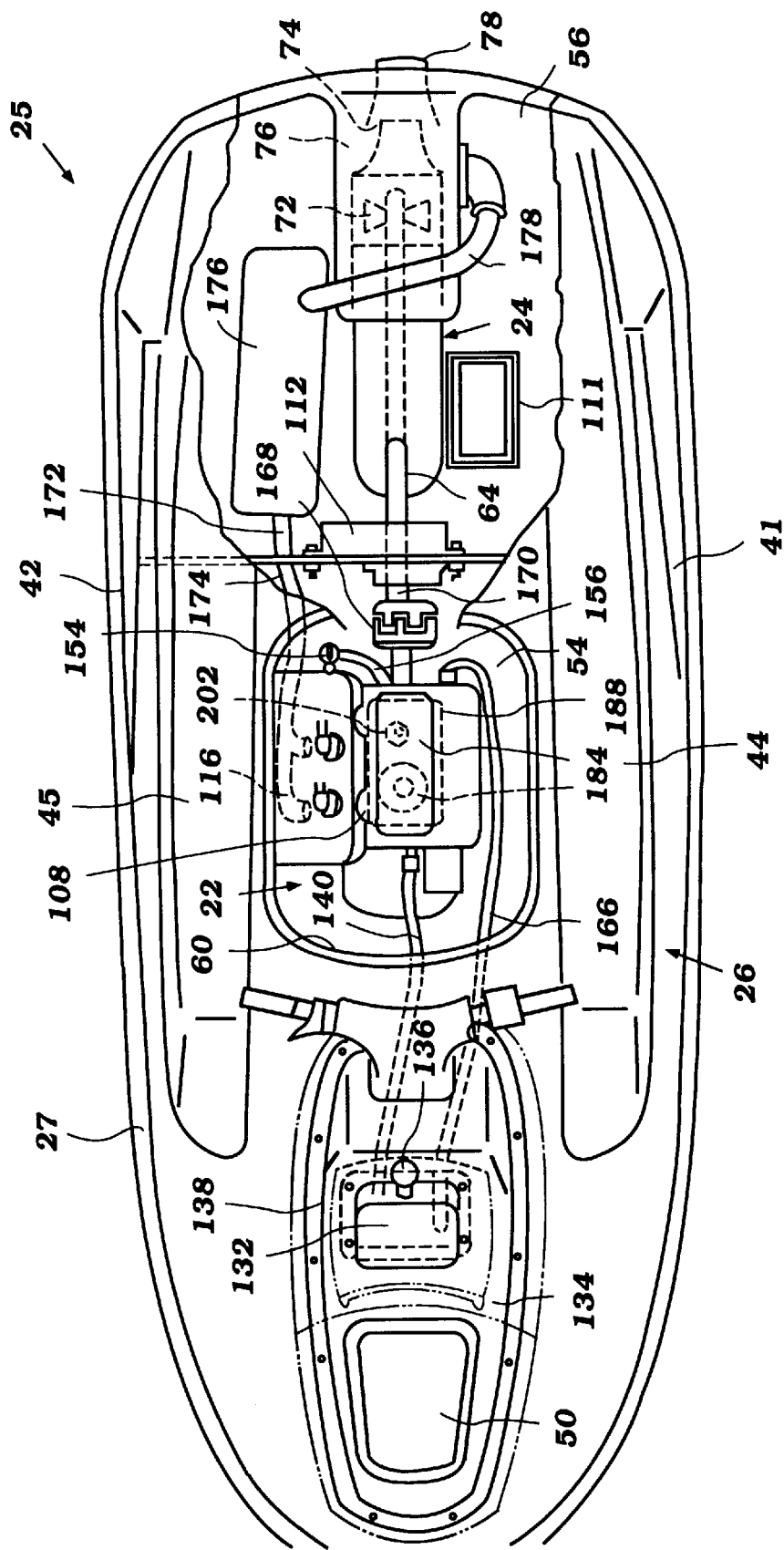
FIG. 2 is a top view of a watercraft, with portions broken away, exposing the engine and other internal features of the watercraft.

The engine 22 is best illustrated in FIGS. 1 and 2. As illustrated therein, the engine 22 is preferably of the two-cylinder, four-cycle variety. Of course, the engine 22 may have as few as one, or more than two, cylinders, as may be appreciated by one skilled in the art.

The engine 22 includes a cylinder block 80 having a cylinder head 82 connected thereto and cooperating therewith to define two combustion chambers 84. A piston 86 is movably mounted in each cylinder, and connected to the crankshaft 62 via a connecting rod 88.

The crankshaft 62 is rotatably journalled with respect to the cylinder block 80 within a crankcase chamber 90. Preferably, the chamber 90 is defined by a crankcase cover member 92 which extends from a bottom portion of the cylinder block 80. In addition, the crankcase member 90 has a number of support walls 94 with respect to which the crankshaft 62 is rotatably journalled.

A toothed or cogged starter gear 96 is positioned on a front end of the crankshaft 62 extending through a front of the support walls 94. In addition, a flywheel 98 preferably has one or more magnets thereon for use in a pulser-coil arrangement. The flywheel 98 is provided on the crankshaft 62 adjacent the starter gear 96.

The crankshaft 62 preferably includes connecting pin portions 100 to which the connecting rods 88 are connected. The connecting pin portions 100 extend between counterweight portions 101 of the crankshaft, as is well known in the art.

The engine 22 includes means for providing an air and fuel mixture to each combustion chamber 84. Preferably, air is drawn in to the engine compartment 54 through a pair of air inlets 102 in the hull 26, as illustrated in FIG. 2. Air is then drawn into an air intake 104 to an air intake passage leading to each combustion chamber 84. Preferably, the flow of air into each combustion chamber 84 is regulated by at least one intake valve (not shown), as is well known to those skilled in the art. The intake valves are operated by an intake camshaft 85 (illustrated schematically in FIG. 4).

Preferably, fuel is provided to each combustion chamber 84 with the incoming air. In particular, fuel is drawn from a fuel tank 106 positioned in the engine compartment 54, by a fuel pump (not shown), and delivered to a carburetor 108 positioned along each intake passage. A throttle control (not shown) is preferably provided for allowing the watercraft operator to control the rate of fuel and air delivery to the engine 22 for controlling the speed and power output of the engine. It is contemplated that the fuel may be provided by indirect or direct fuel injection, as well as via carburation, as known in the art.

A suitable ignition system is provided for igniting the air and fuel mixture provided to each combustion chamber 84. Preferably, this system comprises a spark plug 110 corresponding to each combustion chamber 84. The spark plugs 110 are preferably fired by a suitable ignition system, which preferably includes an electronic control 112 connected to the engine 22 by one or more electrical cables 114. Preferably, the pulser-coil generates firing signals for the ignition system. In addition, the ignition system may include a battery 111 (see FIG. 2) and a magneto or alternator (not shown) for use in providing power to an electric starter and the like.

Exhaust gas generated by the engine 22 is routed from the engine to a point external to the watercraft 20 by an exhaust system which includes an exhaust manifold 116. Exhaust from each combustion chamber 84 is preferably expelled from the combustion chamber to the exhaust manifold 116 through three exhaust passages (not shown). Means are provided for controlling the flow of exhaust gases through these exhaust passages. Preferably, this means comprises an exhaust control valve operated by a camshaft 120. The remainder of the exhaust system is disclosed in detail below.

The intake and exhaust camshafts 85, 120 are mounted for rotation with respect to the cylinder head 82. The camshafts are positioned within a camshaft chamber 121 formed by a camshaft cover 122 connected to the cylinder head 82.

Means are provided for rotating the camshafts 85,120 to effectuate movement of the intake and exhaust valves. Preferably, this means comprises a timing belt 124 which extends about a camshaft sprocket 126 positioned on an end of each camshaft and a drive pulley 128 mounted on the camshaft 62. The timing belt 124 extends through a timing belt housing portion 130 of the engine 22.

As stated above, the crankshaft 62 drives the impeller 72 of the propulsion unit 24. In particular, the end of the crankshaft 62 extends through the crankcase cover 92 to a coupling 168 where it is coupled to a first end 170 of the impeller shaft 64 (see FIGS. 1 and 2).

As best illustrated in FIG. 2, the exhaust manifold 116 is connected to a first portion 172 of an exhaust pipe 174. The exhaust pipe 174 leads to a water lock 176, as well known in the art, and thereon to a second portion of the exhaust pipe 178. The second portion of the exhaust pipe 178 terminates in the chamber 76, where the exhaust gases from the engine 122 are discharged.

Preferably, the watercraft 20 includes a bilge 180 having a screened inlet positioned along the bottom 58 of the hull 26 within the engine compartment 54. A hose 182 leads from the bilge 180 for discharging water pumped from the engine compartment 54 to a point external to the watercraft 20.

The engine 22 includes a lubricating system for providing lubricating oil to the various moving parts thereof. Preferably, the lubricating system is of the "dry-sump" variety, and includes an oil tank or reservoir 132 provided separate from the engine. As illustrated in the embodiment in FIGS. 2, the reservoir 132 is connected to the outside of a hatch portion 134 of the hull 26. The reservoir 132 has a fill spout 136 and is preferably obscured under a visor 138 positioned just in front of the steering handle 40. As illustrated in FIG. 2, the oil reservoir 132 is positioned so that air passing along the top surface of the hull 26 passes under the visor 138 and around the reservoir, thereby cooling the oil therein.

Figure 3:
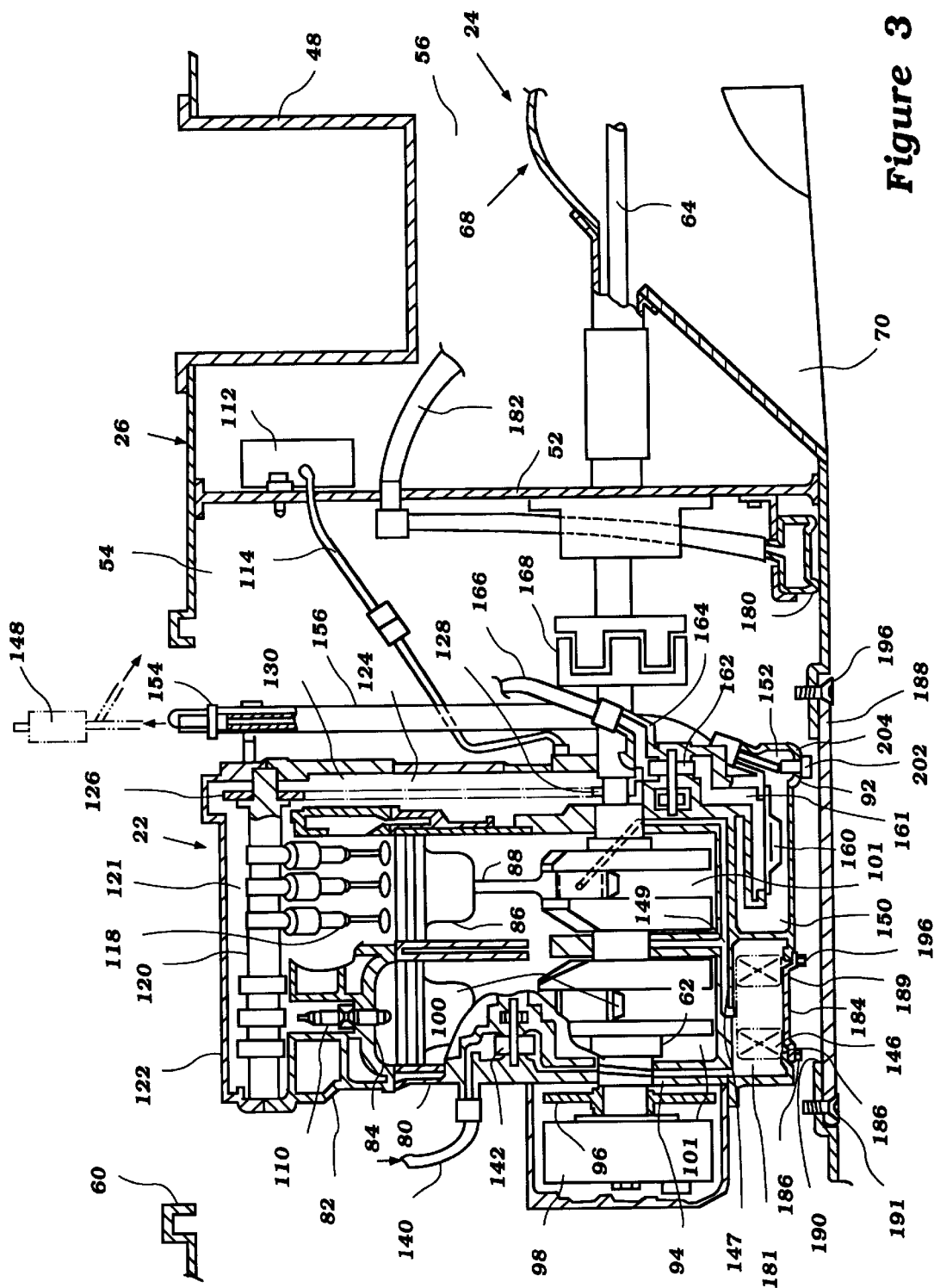
FIG. 3 is an enlarged cross-sectional side view of the engine and surrounding watercraft structure of the watercraft illustrated in FIG. 2.

An oil supply line or hose 140 extends from the reservoir 132 to a supply port 142 extending into the cylinder block 80. An oil pump 144 is provided for pumping the oil through an oil filter 146, and then through oil galleries, including a main gallery 149, of the engine 22. Preferably, the main gallery 149 is formed in a bottom wall 147 of the engine block 82, as best illustrated in FIG. 3.

After traveling through the engine, the oil partially fills a pool area 152 at the end of a lubricant collector 150. An end of a ullage rod 154 extending through a housing 156 allows the operator of the craft to determine if oil is being supplied to the engine.

The collector 150, including the pool area 152, is defined by the cover 92 at the bottom of the engine 22. Preferably, the cover 92 is "V" shaped (see FIG. 4) when viewed from the end, and positioned so that the bottom or lowest portion of the cover 92 (and thus the pool 152) is just vertically above a centerline extending through the hull 26 of the watercraft 20 from its front end to rear end.

Oil which drains into the collector 150 is subsequently drawn upwardly through a filter or screen 160 into a passage 161 leading to a return pump 162. The return pump 162 delivers the oil through an outlet passage 164 and through a return hose or pipe 166 back to the oil reservoir 132.

Referring to FIG. 3, the oil is routed through an oil filter 146 positioned within a chamber 187 formed at the bottom of the engine 22. The chamber is defined in part by the engine block 82, the crankcase cover 92, and a removable cover plate 184. The cover 92 preferably has an opening therein the portion facing the bottom 58 of the hull 26. The plate 184 is removably connected to the cover 92 with one or more bolts 186 or similar fasteners. In the preferred embodiment, the opening is generally circular in shape, as is the plate 184.

As illustrated in FIG. 3, the cover 92 includes a dividing wall 189 forming a portion of the enclosure defining the chamber 187, and serves to separate the chamber 187 from the separating area in which the oil filter 146 is positioned from the collector 150.

As best illustrated in FIGS. 9(*a*) and (*b*), the lubricating oil collected in the pool 152 may be checked. FIG. 9(*a*) illustrates use of a pippet-type lubricant checking device 206. This device includes an elongate clear tube 207 which may be inserted through the housing 156 and into the lubricant. Lubricant may then be drawn from the pool 152 to check its quality. FIG. (*b*) illustrates a dipper-type lubricant checking device 208. This device includes a small container 209 at one end which may be inserted through the housing 156 and into the lubricant. Lubricant may then be removed from the pool 152 to check its quality.

Large quantities of oil may be removed from the lubricating system, as illustrated in phantom in FIG. 3, through an intake line of a vacuum pump 148 extended through the ullage rod housing 156 into the pool 152. This arrangement is not entirely acceptable, since it such a pump 148 may not be available or operable (for example, if a suitable power source is not available). Thus, the engine 22 is also provided with a lubricant system gravity-type drain. The drain preferably comprises a plug 202 provided in a passage leading through a lowest portion 204 of the cover 92.

Advantageously, and in accordance with the present invention, the watercraft 20 and engine 22 are arranged to provide convenient access to the lubricating system including the drain and oil filter 146. In particular, means are provided for accessing the drain of the lubricating system through the hull 26. Preferably, this means comprises an access opening in the lower portion 30 of the hull 26. The access opening 192 is positioned and sized so that at least the drain, and preferably both the oil filter 246 and the drain, are accessible therethrough. In the preferred embodiment, the access opening is provided directly below the drain and filter 246 along the centerline of the hull 26 between the engine mounts 56 and between the ribs 31 extending from the hull.

A hull access opening cover plate 188 is provided for selectively closing the access opening. The cover or plate 188 is adapted to engage a portion of the bottom portion 58 of the hull 26. As best illustrated in FIGS. 3 and 5, the bottom portion 58 of the hull 26 has an indented or recessed lip 190 surrounding the opening 192.

Figure 5:
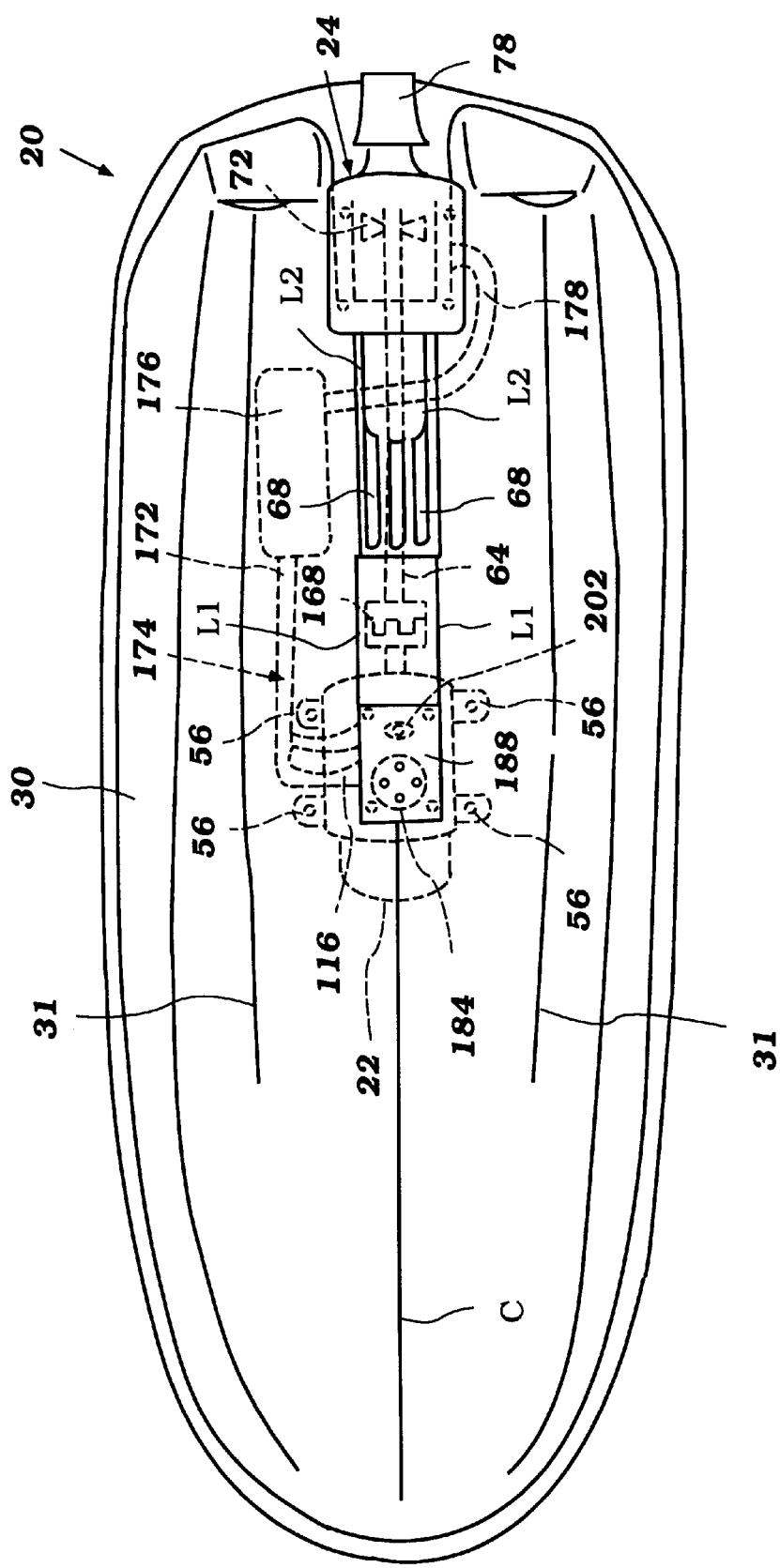
FIG. 5 is a bottom view of the watercraft illustrated in FIG. 1 with the engine and a water propulsion device positioned in the watercraft illustrated in phantom.
Figure 7:
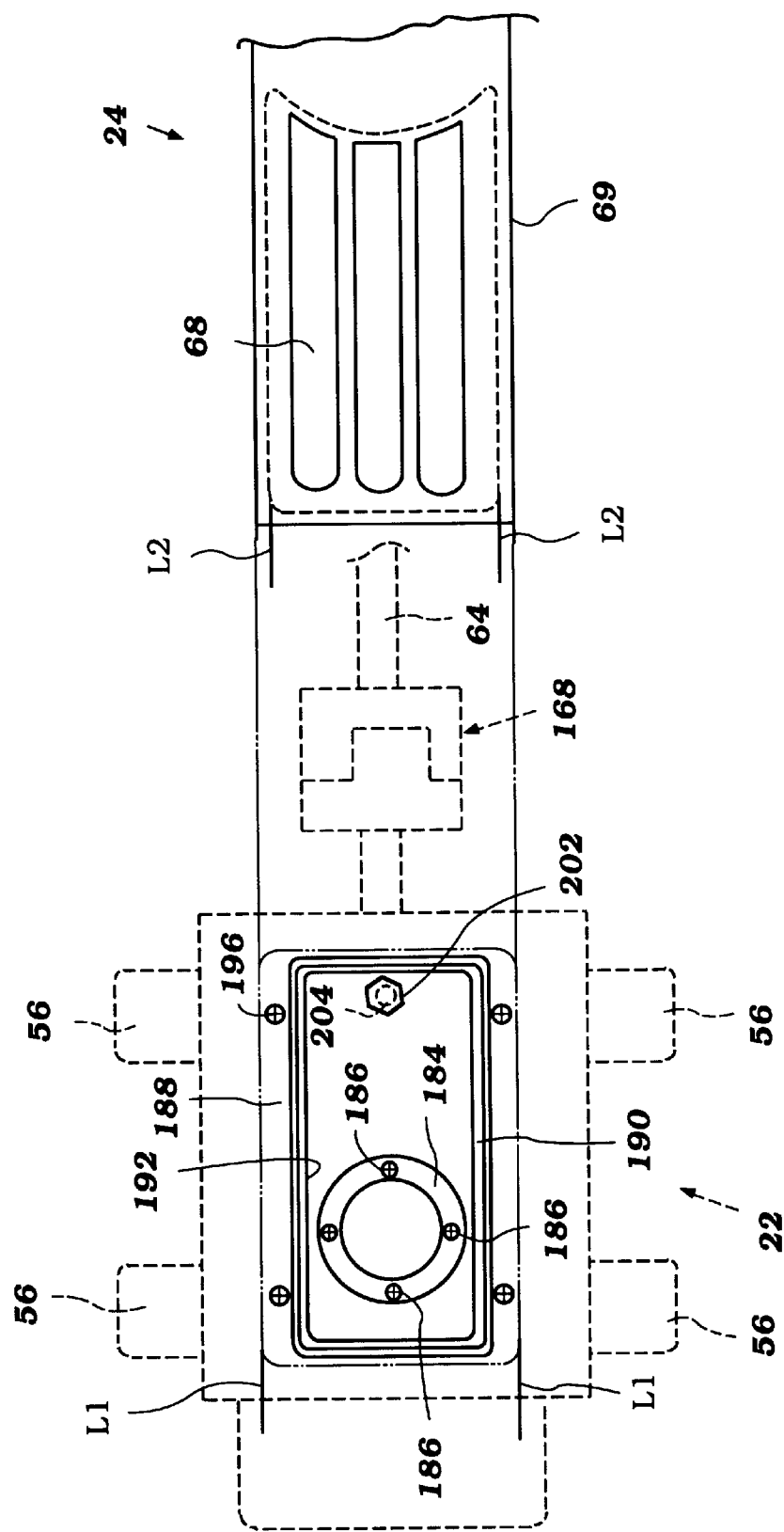
FIG. 7 is a partial bottom view of the watercraft as in FIG. 5, with the access plate illustrated in phantom and exposing an oil filter cover plate of the engine.
Figure 8:
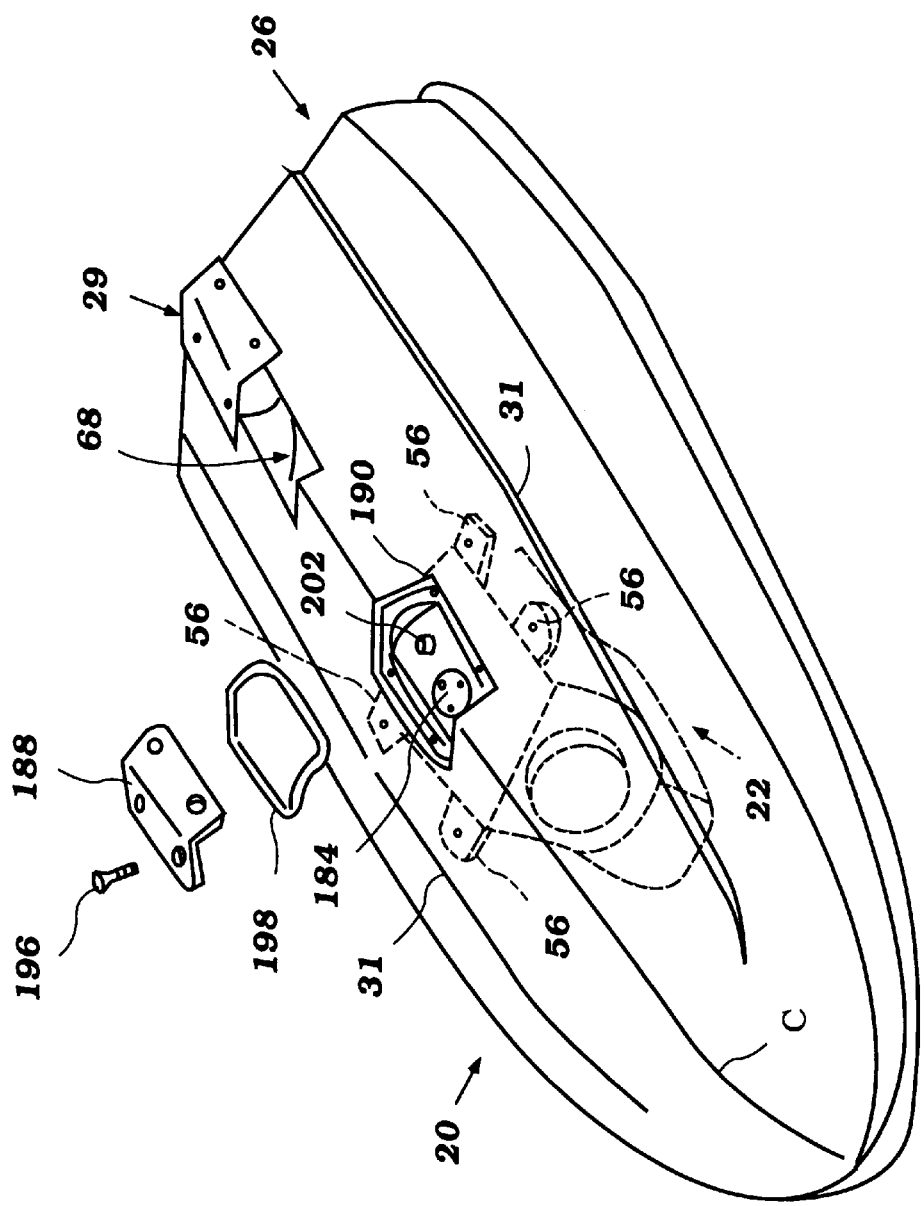
FIG. 8 is a perspective exploded view of the bottom of the watercraft with the access plate illustrated disconnected from the hull.

As illustrated in FIGS. 5 and 7, the opening 192 is generally rectangular in shape, and is positioned along the centerline C of the lower portion 30 of the hull 26. The plate 188 has a pair of outer edges extending generally parallel to the centerline C and a pair of opposing edges extending generally perpendicular to this centerline C (i.e., in the side-to-side direction of the watercraft 20). The plate 188 is also generally "V" shaped, so as to match the contour of the lower portion 30 of the hull at that location. The plate 188 is arranged so that a perimeter thereof contacts a generally flat outwardly facing surface 194 of the lip 190.

Means are provided for removably connecting the plate 188 to the remainder of the hull 26. Preferably, this means comprises several threaded fasteners 196. As illustrated in FIG. 5, four bolts 196 extend through the plate 188 near its corners and into corresponding portions of the lip 190.

Sealing means are provided between the plate 188 and the hull 26 for sealing the access plate 188 to the hull 26 so as to prevent the entry of water through the opening 192 into the interior of the hull 26. As illustrated, a sealing ring 198 is preferably positioned within a trough in a top surface of the plate 188 for abutment against the outwardly facing surface 198 of the lip 190.

Figure 6:
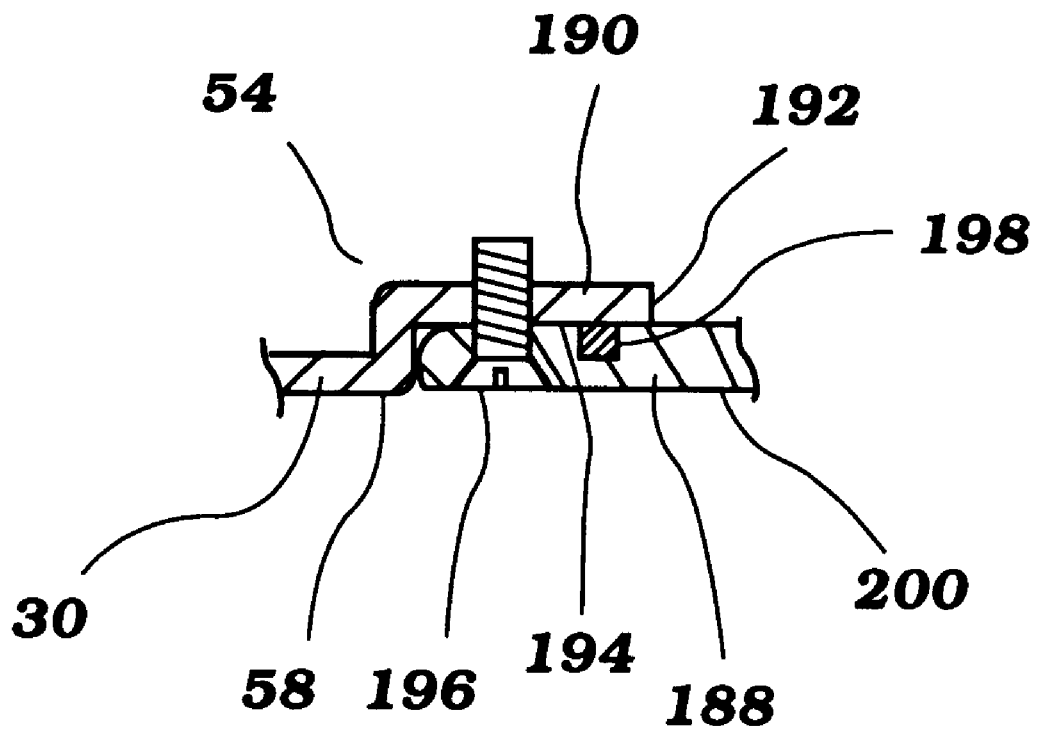
FIG. 6 is an enlarged cross-sectional view of a portion of a hull of the watercraft and an access plate connected thereto.

As illustrated in FIG. 6, the depth of recess of the lip 190 portion of the hull 26 and the thickness and shape of the plate 188 are chosen so that an outer surface 200 of the plate 188 and the lower portion 30 of the hull 26 form a smooth, generally contiguous surface.

As best illustrated in FIGS. 5 and 7, when the plate 188 is connected to the hull 26, its parallel outer side edges extend along lines L1. These lines L1 are outside of lines L2 which extend parallel to the centerline C and define the outer edges of the propulsion intake 68. This design contributes to the prevention of water turbulence in the forward direction of the intake 68 which might lead to a reduction in propulsion efficiency. In particular, the interface of the outer edges of the plate 188 with the hull 26 presents a noncontiguous surface which may cause water turbulence. Because this interface is positioned along lines L1 which are positioned outside of the lines L2 defining the intake water flow, the intake is presented with a smoother flow of water.

Advantageously, a user may remove the access plate 188 and expose the access opening 192. When the watercraft 20 is upright, lubricant flows to the lowest portion of the lubricant system. The user may reach through the opening 192 and remove the drain plug 202, whereupon lubricant drains from the lubricant system. At the same time, the user may remove the oil filter cover plate 184 and replace the oil filter 146. Once service on the lubricant system is complete, the user reattaches the access plate 188.

Figure 10:
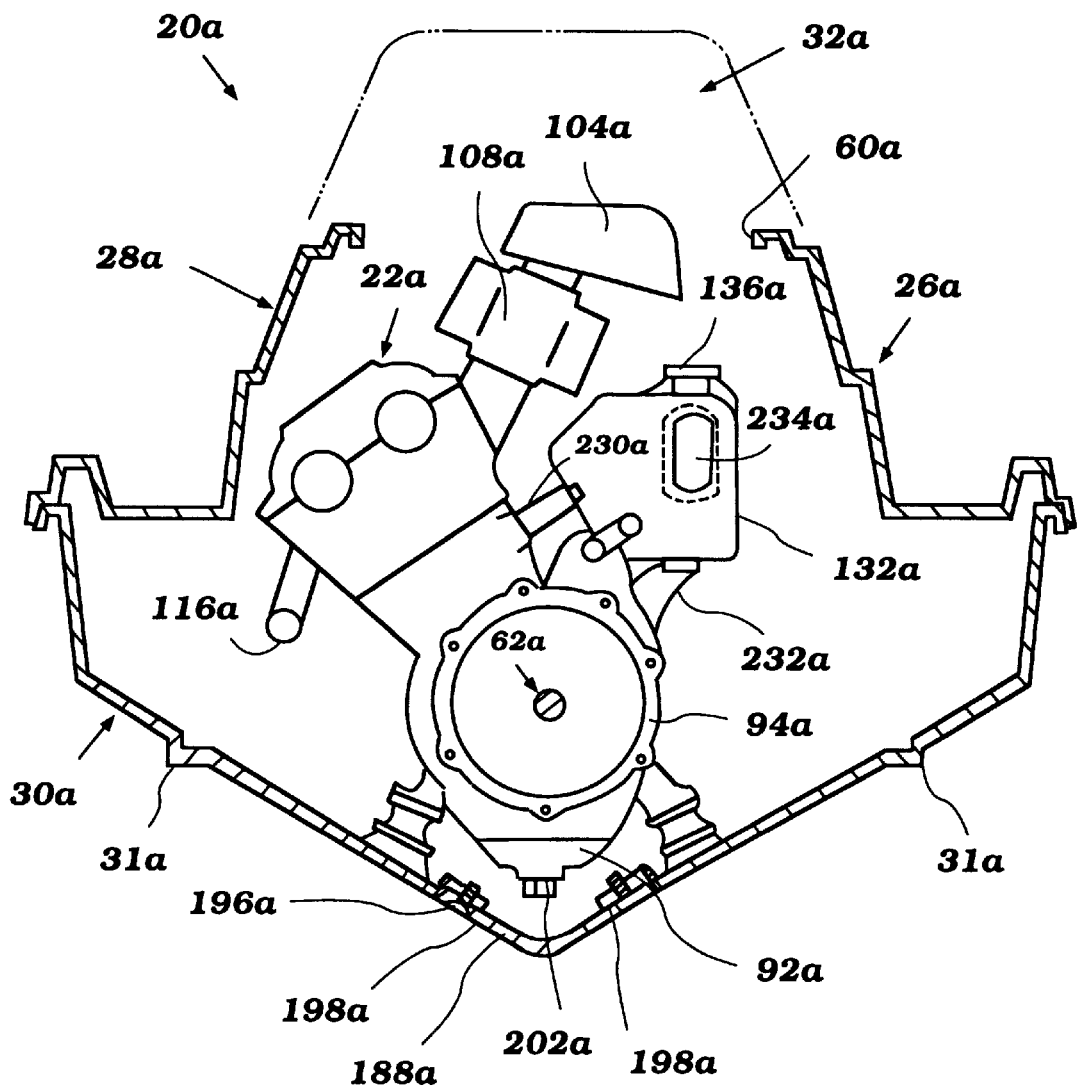
FIG. 10 is a cross-sectional front view of a watercraft having an engine with a lubricating system including a drain in accordance with a second embodiment of the present invention.
Figure 11:
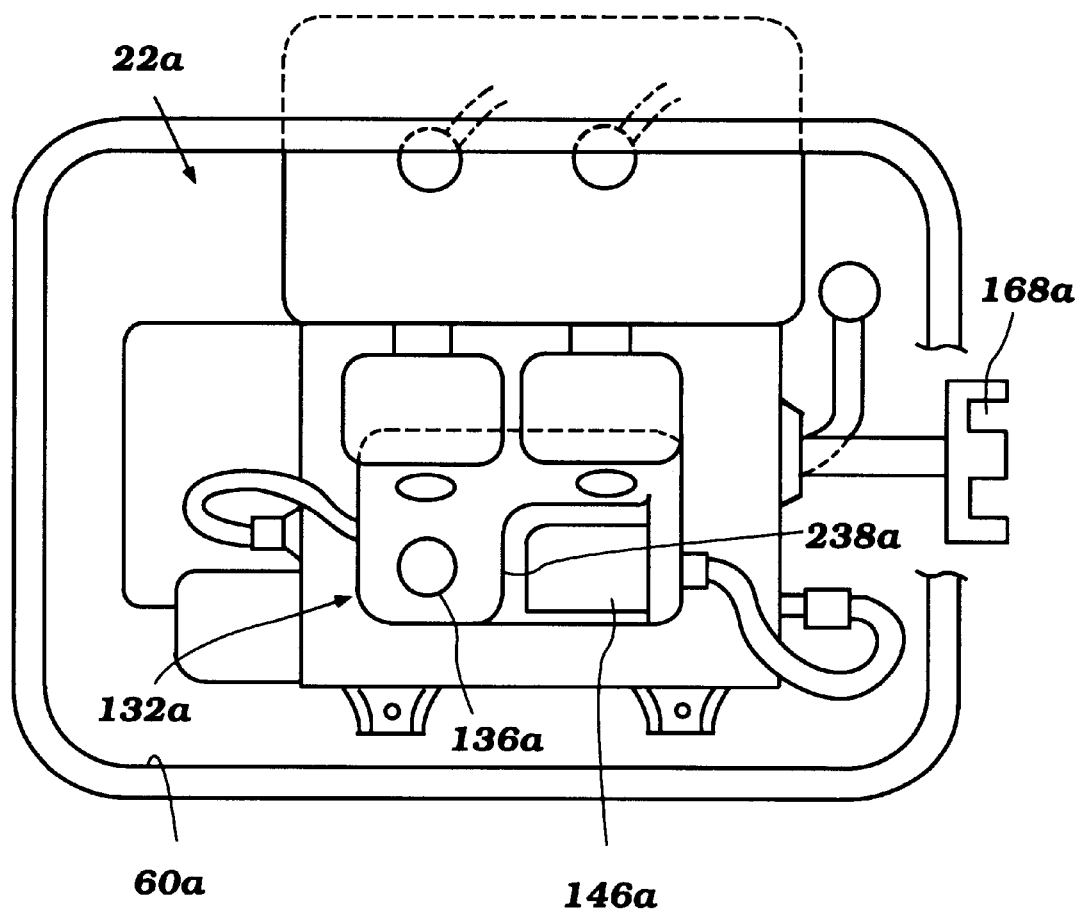
FIG. 11 is a top view of a portion of the watercraft having the engine and lubricating system illustrated in FIG. 10.
Figure 12:
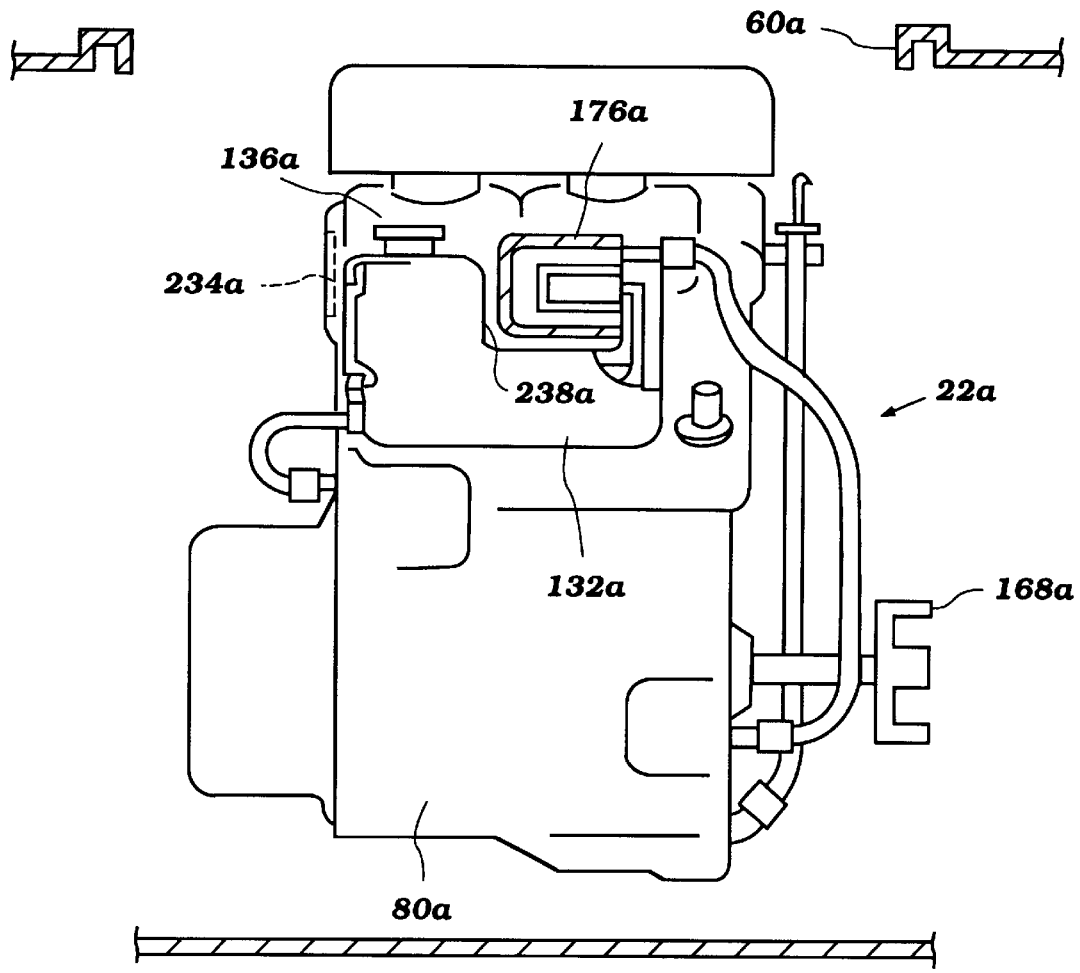
FIG. 12 is a side view of a portion of the watercraft illustrated in FIG. 10, exposing the engine therein.

FIGS. 10–12 illustrate a second embodiment of the present invention. In the description and illustration of this embodiment, like numerals will be used with similar parts to those described in conjunction with the first embodiment and illustrated in FIGS. 1–9, except that an "a" designator has been added all reference numerals.

In this embodiment, the oil tank 132*a* is provided adjacent the engine 22*a*. Preferably, the oil tank 132*a* is connected to the engine 22*a* and supported above the bottom portion 30*a* of the hull 26*a* by first and second boss-type supports 230*a*,232*a* extending from the engine 22*a*. A lubricant check viewing window 234*a* is provided in the tank. Lubricant may be added through a supply port 136*a* or opening.

As best illustrated in FIGS. 11 and 12, the tank 132*a* has a recessed area 238*a* therein for accommodating an oil filter 146*a*. The oil filter 146*a* is arranged to have its inlet connected to a lubricant system return line from the engine, and to have its outlet in communication with the tank 132*a*. The recessed area 238*a* is preferably sized so that the filter 146*a* generally does not increase the total profile of the tank 132*a*.

In this arrangement, only the oil drain is accessible through the access opening provided in the hull 26*a*. The oil filter 146*a* is accessible through the maintenance opening 60*a* positioned under the front seat 32*a* of the watercraft 20*a*.

Figure 13:
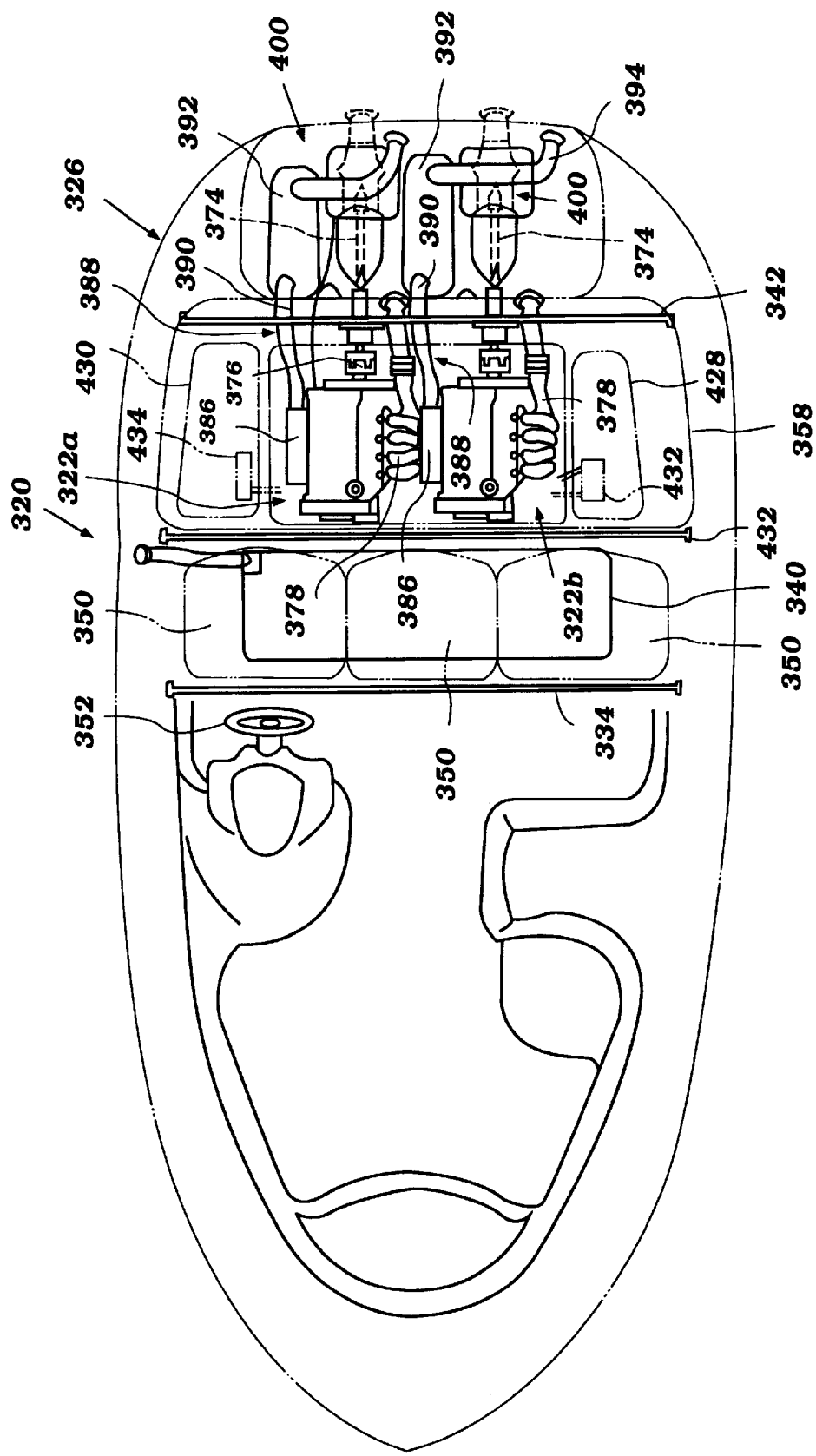
FIG. 13 is a top view, in partial cross-section, illustrating a watercraft powered by a pair engines having a lubricating system with a drain in accordance with a third embodiment of the present invention.
Figure 14:
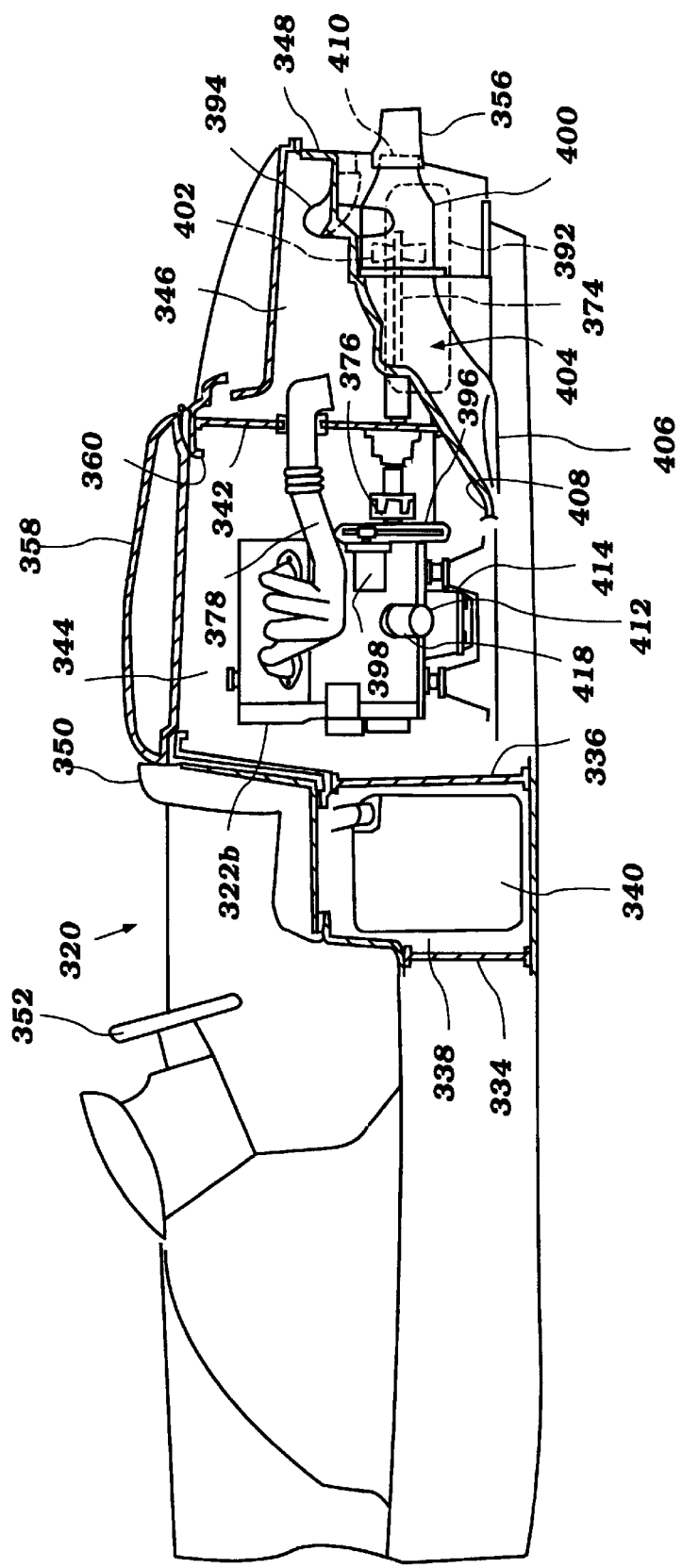
FIG. 14 is a partial side view, in partial cross-section, of the watercraft illustrated in FIG. 13.
Figure 15:
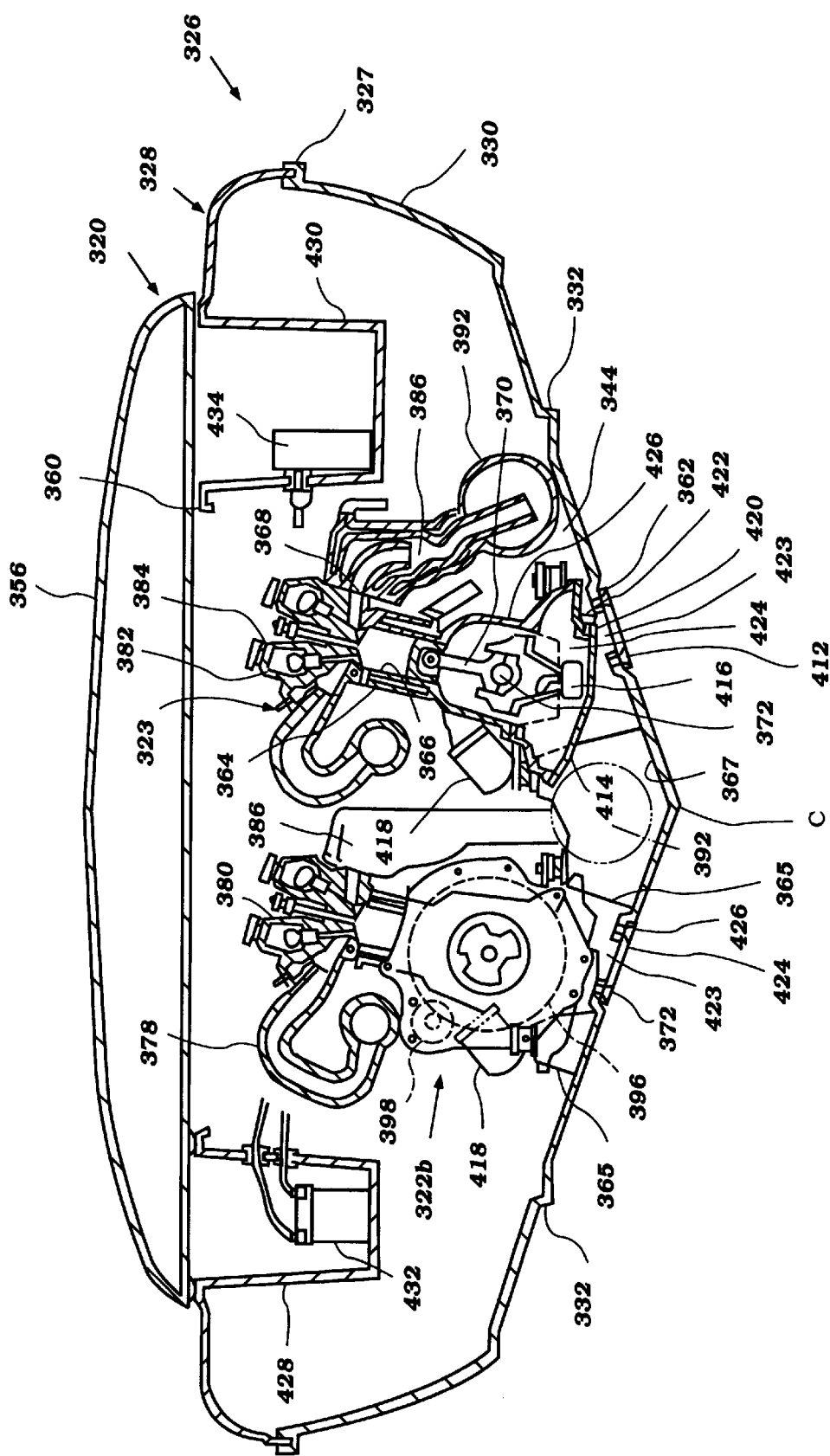
FIG. 15 is a cross-sectional end view of the watercraft illustrated in FIG. 13, exposing a pair of engines therein, the engines illustrated in cross-section as well.

A watercraft 320 powered by a pair of engines 322,323 and having a lubricant system in accordance with a third embodiment of the present invention is illustrated in FIGS. 13–15. As illustrated, the watercraft 320 has a hull 326 comprising a top or deck portion 328 and a lower portion 330. A gunnel 327 defines the intersection of the deck portion 328 and lower portion 330.

In the embodiment illustrate, a pair of ribs 332 extend outwardly from the lower portion 330 of the hull 326 on either side of a centerline C thereof.

The deck 328 and lower portion 330 cooperate to define an interior compartment. As best illustrated in FIG. 14, first and second bulkheads 334, 336 define a compartment 338 in which is positioned a fuel tank 340.

The second bulkhead 336 and a third bulkhead 342 define an engine compartment 344 within the hull 326. A propulsion chamber 346 is defined within the hull 326 by the third bulkhead 342 and a stern portion 348 of the lower portion 330 of the hull 326.

Referring to FIG. 15, first and second component compartments 428,430 are provided between the second and third bulkheads 336,342. Preferably, a battery 432 or similar component is mounted in the first compartment 428, and a control unit 434 or similar component is mounted in the second compartment 430.

As best illustrated in FIG. 14, seats 350 are connected to the deck portion 328 of the hull 326. Preferably, three seats 350 are connected to removable cover elements positioned over the compartment 338, whereby the compartment 338 and the fuel tank 340 therein are easily accessible.

A steering wheel 352 is positioned near one of the seats, the wheel 352 connected to a steering nozzle 356, described in more detail below, for use in steering the craft 320. A removable lid 358 is provided over an opening 360 in the deck portion 328 for accessing the engine compartment 344 and the compartments 338,340.

The engines 322,323 are positioned in the engine compartment 344, and preferably securely mounted to a bottom surface 367 of the lower portion 330 of the hull 326 with at least one engine mount 365. The engines 322,323 may be of a variety of types and arranged in any manner known in the art. As illustrated, the engines 322,323 are of the in-line, four cylinder variety, operating on a four-cycle principle. As such, each engine 322,323 comprises a block 362 having a head 364 connected thereto. The block 362 and head 364 cooperate to define therein four cylinders 366.

A piston 368 is movably positioned in each cylinder 366. The piston 368 is connected, via a connecting rod 370, to a crankshaft 372. As best illustrated in FIGS. 13 and 14, the crankshaft 372 of each engine 322,323 is coupled to an impeller shaft 374 by a coupling 376.

Fuel is provided to each cylinder 366 for combustion. Preferably, fuel is delivered directly into each cylinder 366 or into air provided to each cylinder by a charge forming element (not shown). Fuel is supplied each charge former by a fuel system which includes the fuel tank 340, and means for delivering fuel from the tank 340 to each charge forming element.

Air is provided to each cylinder 366 for combustion of the fuel. Preferably, air is drawn through one or more inlets into the propulsion chamber 346. Air from within the chamber or compartment 346 is then drawn into an intake manifold 378 and delivered through branches thereof to intake passages leading to each cylinder 366. One or more valves preferably control the flow of air through each intake passage to its respective cylinder 366. These valves may be operated with a camshaft 380 or by other means known in the art. Preferably, each camshaft 380 is positioned within a cover 382 having an opening 384 therein. The opening 384 is preferably selectively closed with a lid, allowing a user of the craft to add lubricant to a lubricating system (described in more detail below) through the opening 384.

Exhaust generated by each engine 322,323 is routed through an exhaust passage corresponding to each cylinder 366 to an exhaust manifold 386 of an exhaust system 388. The exhaust flows through an exhaust pipe portion 390 of the manifold 386 into a waterlock/expansion chamber 392, and thereafter through a lower exhaust pipe 394 to an external discharge point from the watercraft 320.

A flywheel 396 is preferably mounted on the crankshaft 372 at one end of the engine 322,323. The flywheel 396 is preferably positioned within a housing at the end of the engine 322,323 near the coupling 376. A starter motor 298 is preferably provided for engagement with the flywheel 396 for use in starting the engine, as is well known in the art.

Each engine 322,323 drives a propulsion unit 400. Each propulsion unit 400 includes means for propelling water out the rear of the craft 320. Preferably, this means comprises an impeller 402. The impeller 402 is mounted in a propulsion passage 404 having an inlet 406 in the lower or bottom portion 330 of the hull 326. The propulsion passage 404 is preferably defined by a wall 408.

The impeller 402 is driven by the impeller shaft 374, and draws water through the inlet 406 of the passage 404 and expels it out an outlet 410 facing the stern or rear of the watercraft 320. The outlet 410 is preferably positioned within the steerable nozzle 356, whereby the user may direct the stream of propelled water so as to guide the watercraft 320.

The watercraft 320 and engines 322,323 include a lubricating system arranged in accordance with a third embodiment of the present invention. Preferably, the lubricating system is of the recirculating variety, having a sump 412 defined by a pan 414 connected to the bottom of the engine 322,323. The pan 414 encloses the lower portion of the engine 322,323, and thus the crankshafts 372 rotating therein, and is arranged so that oil flows through the engine and down into the sump 412.

An oil pump 416 is provided in the sump 412. The oil pump 416 pumps oil from the sump 412 and delivers it through an oil filter 418 to the engine 322,323. As illustrated, the filter 418 is positioned along the side of the engine 322,323 near its bottom, angling downwardly towards the lower portion 330 of the hull 326.

A drain is provided for draining the lubricant from the lubricating system. Preferably, this drain comprises a passage 420 leading through the pan 414 at its lowest point. A drain plug 422 is selectively positioned in the passage 420. Removal of the plug 422 permits the oil to be drained from the sump 412, while installation of the plug 422 maintains the oil within the sump 412.

Means are provided for accessing the lubricating system, including the drain. In the preferred embodiment, this means comprises an access opening 423 provided in the hull 326 corresponding to each engine 322,323. As illustrated in FIG. 15, an opening is provided in the lower portion 330 of the hull 326 in that position just below the drain for the lubricating system of each engine 322,323. The opening is selectively covered by an access plate or cover 424, in a manner similar to that illustrated in FIGS. 1–9 and described above. Means are provided for removably fastening the cover 424 to the hull 326, whereby the cover 424 may be removed to exposed the opening (and thus the drain plug 422 of the lubricating system adjacent thereto) or close the opening to maintain the hull 326 in watertight form.

As with the embodiments described above, a seal may be provided between the cover 424 and hull 326 for providing a watertight seal. In the embodiment illustrated, threaded fasteners 426 provide the connection between the cover 424 and the hull 326. Further, the lower portion 330 of the hull 326 is provided with a recessed lip to accommodate the cover 424 in a manner that the exterior surface of the hull 326, including the cover 424 when installed, is generally smooth.

Figure 16:
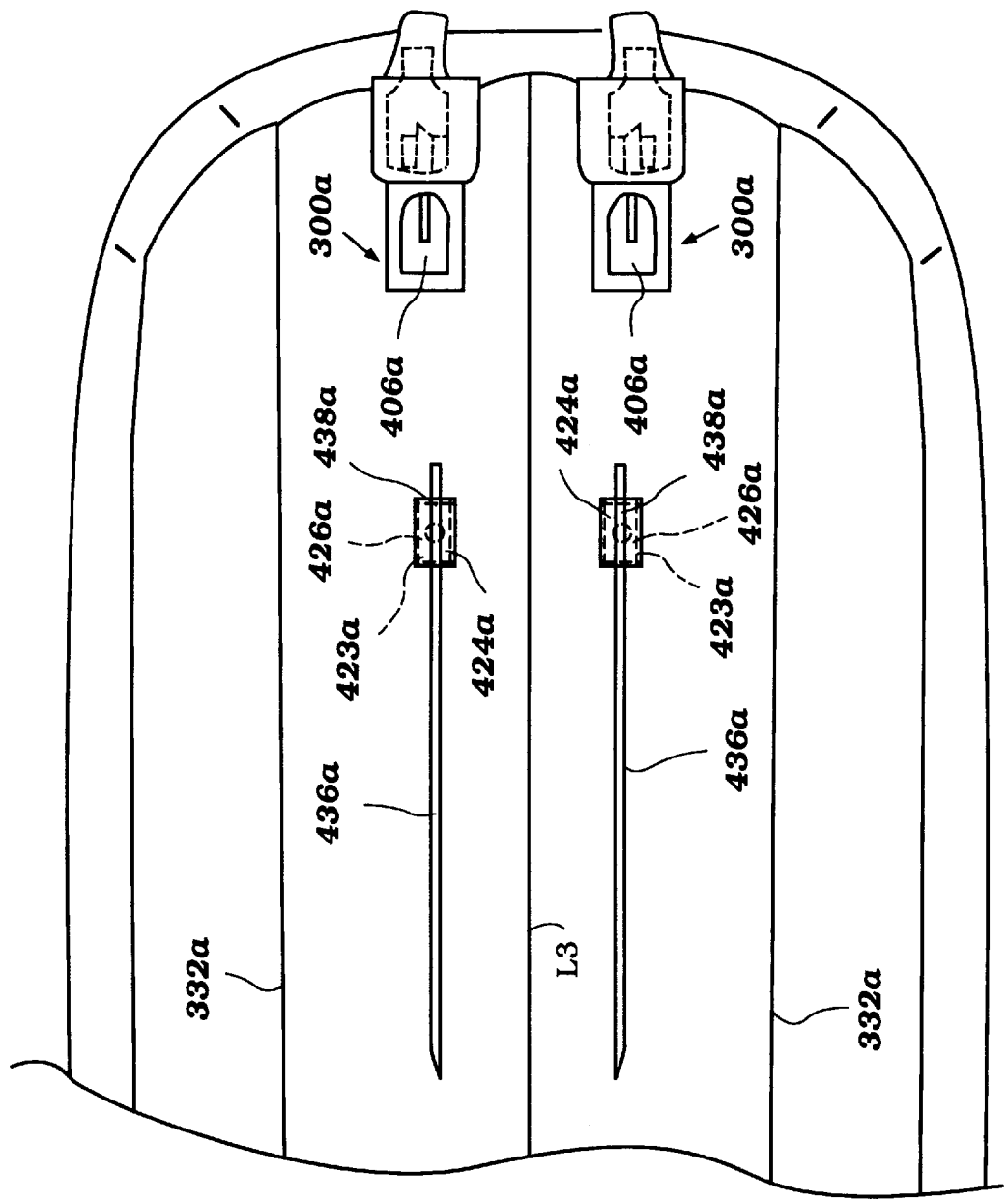
FIG. 16 is a view of a portion of the bottom of a watercraft arranged in accordance with a fourth embodiment of the present invention.
Figure 17:
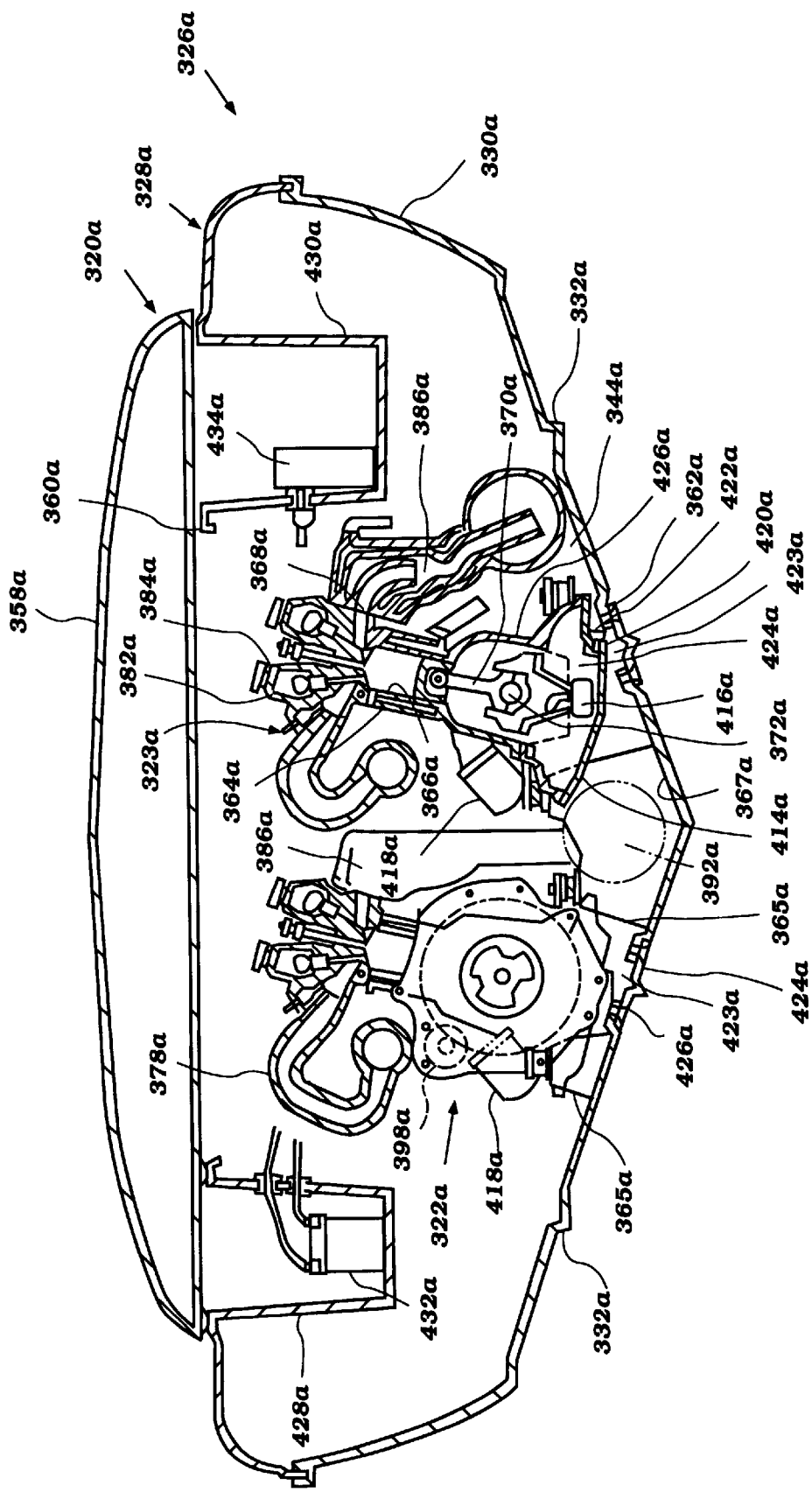
FIG. 17 is a cross-sectional end view of the watercraft illustrated in FIG. 16, exposing a pair of engines therein, the engines illustrated in cross-section as well.

FIGS. 16 and 17 illustrate a fourth embodiment drain arrangement in accordance with the present invention. This embodiment is similar to the last illustrated in FIGS. 13–15 and described above, and as such similar parts have been given similar reference numerals to those used therein, except that an "a" designator has been added to all reference numerals associated therewith.

In this embodiment, an rib 436a extends outwardly from the bottom portion 430a of the hull 426a on either side of a centerline L3 thereof. As illustrated, these ribs 436a are between an outer set of ribs 332a. Preferably, the lubricating system for each engine 322a,323a is arranged so that the access plate 424a is positioned along the rib 436a and yet still permits access to the drain plug 422a. In this arrangement, the plate 424a includes an outwardly extending rib 438a. When connected to the hull 426a, the rib 438a on the plate 424a aligns with the rib 436a on the hull 426a, providing a contiguous rib along the hull.

This arrangement is beneficial, since the location of the rib 436a, including that portion 438a on the plate 424a, serves to reduce the water turbulence otherwise created by the continuity break in the hull occurring at the plate 424a.

Of course, the foregoing description is that of preferred embodiments of the invention, and various changes and modifications may be made without departing from the spirit and scope of the invention, as defined by the appended claims.

What is claimed is:

1. A watercraft having a water propulsion device powered by an internal combustion engine, said engine mounted to a hull of said watercraft, said engine having a lubricating system including a lubricant collector positioned at a bottom of said engine and a lubricating system drain positioned at said bottom of said engine through which lubricant may be drained from said collector, said hull having an access opening provided in a bottom thereof vertically below said lubricant drain, and further including a hull access opening cover plate for selectively opening and closing said access opening.

2. The watercraft in accordance with claim 1, wherein said lubricating system includes an oil filter, said oil filter accessible through said access opening.

3. The watercraft in accordance with claim 2, wherein said oil filter is positioned in a chamber of said engine, said chamber accessible through a cover member positioned at said bottom of said engine.

4. The watercraft in accordance with claim 1, wherein said engine is connected to said hull with at least a pair of engine mounts and said access opening is provided between said engine mounts.

5. The watercraft in accordance with claim 1, wherein said lubricant collector is defined by an pan element connected to a cylinder block of said engine.

6. The watercraft in accordance with claim 1, wherein said water propulsion device has an inlet positioned in said bottom of said hull, and wherein said cover plate has outside edges positioned along lines which are outside of said inlet.

7. The watercraft in accordance with claim 1, wherein said hull has an outwardly extending rib and said cover plate has an outwardly extending rib, such that when said cover plate is connected to said hull, said rib on said cover plate aligns with said rib on said hull.

8. The watercraft in accordance with claim 1, wherein said hull is recessed in the area of said access opening.

9. The watercraft in accordance with claim 1, further including a seal positioned between said cover plate and said hull.

10. The watercraft in accordance with claim 1, wherein said hull is generally "V"-shaped and has a centerline, and wherein said access opening is provided along said centerline and said cover plate is generally "V"-shaped.

11. The watercraft in accordance with claim 1, wherein said watercraft has a first engine and a second engine positioned in said hull and arranged to drive said water propulsion device.

12. The watercraft in accordance with claim 11, wherein a first access opening is provided corresponding to a lubricating system drain of said first engine and a second access opening is provided corresponding to a lubricating system drain of said second engine.

13. The watercraft in accordance with claim 12, wherein said first and second access openings are provided on either side of a centerline of said hull.

14. The watercraft in accordance with claim 12, wherein said hull has a pair of ribs extending outwardly therefrom, and wherein a first cover plate associated with said first access opening and a second cover plate associated with said second access opening each have a rib thereon, which, when said plates are connected to said hull, align with said ribs on said hull.

15. The watercraft in accordance with claim 10, wherein said lubricant collector is defined by a "V"-shaped pan.

16. The watercraft in accordance with claim 1, wherein said lubricating system is of the dry-sump variety and includes an lubricant tank, lubricant delivered from said tank to said engine and then returned from said collector to said tank.

17. A watercraft propelled by a water propulsion device, said watercraft having a hull having a bottom, water-engaging surface having a centerline therethrough, and an engine mounted to said hull and arranged to drive said water propulsion device, said engine having a lubricating system, said lubricating system including a lubricant collection area below said engine near said bottom of said hull, and a lubricant drain, said drain including an access opening through said bottom of said hull along said centerline, and a drain passage leading from said collection area to a point generally vertically above said access opening.

18. The watercraft in accordance with claim 17, further including a drain plug selectively positionable in said passage for opening or closing said passage.

19. The watercraft in accordance with claim 17, further including a removable cover plate associated with said access opening.

20. The watercraft in accordance with claim 17, wherein said collection area is defined by an oil pan connected to a bottom of said engine.

21. The watercraft in accordance with claim 19, further including means for selectively connecting said cover plate.

* * * * *